(12) United States Patent
Uehara (10) Patent No.: US 11,948,600 B2
(45) Date of Patent: Apr. 2, 2024

(54) DISK CLAMP WITH UNBALANCE CORRECTION CAPABILITY AND DISK DEVICE WITH THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Manabu Uehara, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/821,978

(22) Filed: Aug. 24, 2022

(65) Prior Publication Data
US 2023/0230619 A1 Jul. 20, 2023

(30) Foreign Application Priority Data
Jan. 14, 2022 (JP) ................................. 2022-004385

(51) Int. Cl.
| | | |
|---|---|---|
| G11B 17/028 | (2006.01) | |
| G11B 17/038 | (2006.01) | |
| G11B 25/04 | (2006.01) | |
| G11B 33/08 | (2006.01) | |
| G11B 33/12 | (2006.01) | |

(52) U.S. Cl.
CPC ........ *G11B 17/0287* (2013.01); *G11B 17/038* (2013.01); *G11B 25/043* (2013.01); *G11B 33/08* (2013.01); *G11B 33/12* (2013.01)

(58) Field of Classification Search
None
See application file for complete search history.

(56) References Cited

U.S. PATENT DOCUMENTS

| | | | |
|---|---|---|---|
| 4,561,035 A * | 12/1985 | McDorman et al. ....................... G11B 17/0287 360/99.12 | |
| 5,517,376 A * | 5/1996 | Green ................. G11B 17/038 360/98.08 | |
| 5,537,272 A | 7/1996 | Kazmierczak et al. | |
| 5,572,382 A | 11/1996 | Kuno | |
| 6,550,328 B1 | 4/2003 | Horning et al. | |

(Continued)

FOREIGN PATENT DOCUMENTS

JP S62-18851 U 2/1987

*Primary Examiner* — Craig A. Renner
(74) *Attorney, Agent, or Firm* — Knobbe, Martens, Olson & Bear, LLP (57) ABSTRACT

According to one embodiment, a disk clamp includes a disk-shaped main body including a central axis line, an annular mounting groove provided in a first surface of the main body, in which a wire for unbalance adjustment is mountable, a plurality of through-holes formed through the main body and spaced apart from each other equally in a circumferential direction around the central axis line, through each of which a fixing screw is insertable, and a plurality of female threaded holes formed on the first surface of the main body and spaced apart from each other equally in the circumferential direction, through each of which an adjustment screw for balancing adjustment is screwable.

15 Claims, 8 Drawing Sheets

(56) References Cited

U.S. PATENT DOCUMENTS

| | | | | |
|---|---|---|---|---|
| 6,563,668 B1* | 5/2003 | Suwito | ............... | G11B 17/0287 360/98.08 |
| 6,624,968 B1* | 9/2003 | Chessman et al. | .......................... | G11B 17/0287 360/99.12 |
| 6,724,568 B1* | 4/2004 | Suwito et al. | ....... | G11B 17/038 360/99.12 |
| 7,307,813 B1* | 12/2007 | Suwito | ............... | G11B 17/0287 360/98.08 |
| 8,305,708 B2* | 11/2012 | Tacklind | ............ | G11B 17/0287 360/99.12 |
| 8,922,946 B1* | 12/2014 | Brown et al. | ...... | G11B 17/0287 360/99.12 |
| 2021/0272603 A1* | 9/2021 | Uehara et al. | ..... | G11B 19/2009 |

* cited by examiner

DISK CLAMP WITH UNBALANCE CORRECTION CAPABILITY AND DISK DEVICE WITH THE SAME

CROSS-REFERENCE TO RELATED APPLICATIONS

This application is based upon and claims the benefit of priority from Japanese Patent Application No. 2022-004385, filed Jan. 14, 2022, the entire contents of which are incorporated herein by reference.

FIELD

Embodiments described herein relate generally to a disk clamp for clamping disks and a disk device comprising the same.

BACKGROUND

As a disk device, for example, a hard disk drive (HDD) includes a plurality of magnetic disks rotatably arranged in a housing, a plurality of magnetic heads which read and write information to and from the magnetic disks, and a head actuator which supports the magnetic heads movably with respect to the magnetic disks. On the bottom wall of the housing, a spindle motor is installed. The magnetic disks are mounted on the hub of the spindle motor and further fixed to the hub by a disk-shaped clamp.

Usually, the magnetic disks and spacer rings interposed between the magnetic disks are designed so that their inner diameters are slightly larger than that of the hub to allow smooth insertion into the hub of the spindle motor. Therefore, the magnetic disks and spacer rings thus mounted have a rattling of about 10 μm in the radial direction with respect to the hub. When the magnetic disks and spacer rings are fixed in a position where the center of gravity is biased against the center of rotation of the hub, a shift in the center of gravity (unbalance) of the rotating body occurs.

Unbalance of the rotating body is a source of vibration to the device itself and surrounding structures, and exhibits adverse effects such as degradation in performance of magnetic disk devices, and therefore it is desirable to minimize it. As a known method of correcting the unbalance is to place an arc-shaped wire in a groove of the disk clamp and adjust it to control the unbalance within a certain amount. The amount of correction of unbalance can be adjusted by the length of the wire. Further, by making the wire thicker and heavier, the ability of the wire to correct the imbalance can be increased.

However, as the number of magnetic disks and spacer rings mounted on a magnetic disk device increases, the unbalance of individual parts accumulate, which may result in a device with an unbalance that is excessively great to be corrected by the wire. Such devices must be disassembled and reassembled to remedy the situation, which is one of the factors that deteriorate the efficiency of manufacturing of magnetic disk devices.

If the wire for balance correction is made thicker, the clamp groove for inserting the wire must as well be enlarged, and therefore it is necessary to increase the thickness of the clamp. As the clamp is thicker, it becomes harder a barrier to mount a large number of magnetic disks and clamps within a device of a limited height. In addition, as the wire is thicker, it is less flexible, which makes it difficult to install it in the groove of the clamp.

DETAILED DESCRIPTION

Various embodiments will be described hereinafter with reference to the accompanying drawings. In general, according to one embodiment, a disk clamp comprises a disk-shaped main body including a central axis line; an annular mounting groove provided in a first surface of the main body, in which a wire for unbalance adjustment is mountable; a plurality of through-holes formed through the main body and arranged to be spaced apart from each other equally in a circumferential direction around the central axis line, through each of which a fixing screw is insertable; and a plurality of female threaded holes formed on the first surface of the main body and spaced apart from each other equally in the circumferential direction, into each of which an adjustment screw for balancing adjustment is screwable.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

As a disk device, a hard disk drive (HDD) according to the first embodiment will be described in detail.

Figure 1:
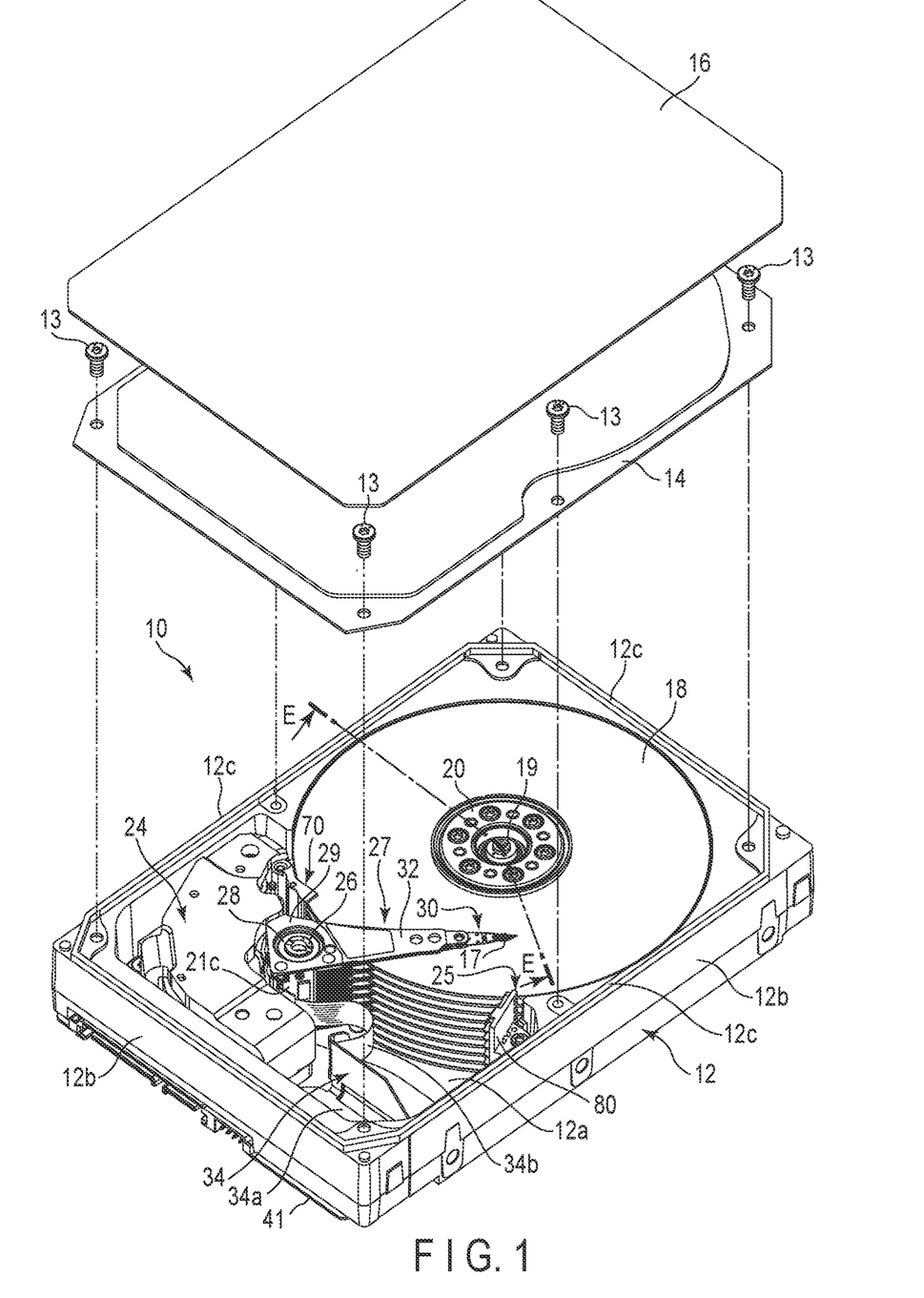
FIG. 1 is a perspective view of a hard disk drive (HDD) according to a first embodiment with a top cover thereof disassembled.

FIG. 1 is an exploded perspective view of the HDD of the first embodiment shown with a top cover removed.

As shown in FIG. 1, the HDD comprises a rectangular-shaped housing 10. The housing 10 includes a rectangular box-shaped base 12 with an upper opening, an inner cover 14 that is screwed to the base 12 with a plurality of screws 13 to closes the upper opening of the upper end of the base 12, and an outer cover 16 placed over the inner cover 14 and including a circumferential portion welded to the base 12. The base 12 includes a rectangular bottom wall 12a opposing the inner cover 14 with a gap therebetween, and side walls 12b provided to stand along the periphery of the bottom wall 12a, which are formed to be integrated with each other as one body from, for example, aluminum alloy. The side walls 12b include a pair of long side walls opposing each other and a pair of short side walls opposing each other. On the upper end surface of the side walls 12b, substantially rectangular frame-shaped fixing ribs 12c are provided to protrude.

The inner cover 14 is formed of, for example, stainless steel into a rectangular plate. The inner cover 14 is fixed to the upper surfaces of the side walls 12b by screws 13, and is fixed to an inner side of the fixing ribs 12c. The outer cover 16 is formed of, for example, aluminum into a rectangular plate. The outer cover 16 is formed a slightly larger in planar dimensions than the inner cover 14. The outer cover 16 includes a peripheral portion welded to the fixing ribs 12c of the base 12 over its entire circumference and is hermetically fixed to the base 12. After the outer cover 16 is fixed, a gas having a density lower than that of air, for example, helium (He), is sealed into the housing 10.

In the housing 10 are provided a plurality of, for example, ten magnetic disks 18, as disk-shaped recording media, and a spindle motor 19 as a drive motor for supporting and rotating the magnetic disks 18. The spindle motor 19 is disposed on the bottom wall 12a. Each of the magnetic disks 18 includes a substrate which is made of a nonmagnetic material, for example, glass or aluminum and is formed into a discoidal shape having, for example, a diameter of 96 mm (3.5 inches) and a thickness of 0.5 to 0.635 mm, and magnetic recording layers respectively formed on an upper surface (first surface) and a lower surface (second surface) of the substrate. The magnetic disks 18 are fit to a spindle hub of the spindle motor 19, which will be described later, so as to be coaxial with each other and further clamped by a disk clamp (hereinafter referred to as "clamp") 20. Thus, the magnetic disks 18 are supported in a state parallel to the bottom wall 12a of the base 12. The multiple magnetic disks 18 are rotated at a predetermined speed by the spindle motor 19. The number of magnetic disks 18 mounted is not limited to ten, but may be nine or less, or eleven or more.

The housing 10 contains therein a plurality of magnetic heads 17 which record and reproduce information with respect to the magnetic disks 18, and an actuator assembly 27 which supports the magnetic heads 17 movably with respect to the magnetic disks 18, respectively. Further, in the housing 10 are provided a voice coil motor (VCM) 24 which rotates and positions the actuator assembly 27, a ramp load mechanism 25 which holds the magnetic heads 17 in an unload position spaced away from the respective magnetic disk 18 when the magnetic head 17 moves to the outermost circumference of the magnetic disk 18, a spoiler 70, and a board unit (FPC unit) on which electronic components such as conversion connectors and the like are provided. The ramp loading mechanism 25 includes a ramp 80 provided to stand on the bottom wall 12a.

The actuator assembly 27 comprises an actuator block 29 with a through-hole, a bearing unit (unit bearing) 28 provided in the through-hole, a plurality of, for example, eleven arms 32 extending from the actuator block 29, a suspension assembly(, which may as well be referred to as a head gimbal assembly: HGA) 30 and magnetic heads 17 supported by the suspension assembly 30. The actuator block 29 is supported by the bearing unit 28 so as to be pivotable around the support shaft 26 provided to stand on the bottom wall 12a.

The FPC unit 34 includes a substantially rectangular base portion 34a folded into an L shape, a slender strip-shaped relay portion 34b extending from one side edge of the base portion 34a, and a joint portion 21c provided continuous to the distal end of the relay portion 34b, integrated into one body. The base portion 34a, the relay portion 34b, and the joint portion 21c are formed by a flexible printed circuit board (FPC).

On the base portion 34a, electronic components such as a conversion connector, a plurality of capacitors, and the like, not shown in the figure, are mounted and electrically connected to the wiring lines of the FPC. The base portion 34a is installed on the bottom wall 12a of the base 12. The relay portion 34b extends from the side edge of the base portion 34a toward the actuator block 29 of the actuator assembly 27. The joint portion 21c provided at the extending end of the relay portion 34b is attached to a side surface (installation surface) of the actuator block 29 and fixed thereto by screw. A number of connection pads are provided on the joint portion 21c. Each magnetic head 17 of the actuator assembly 27 is electrically connected to the respective connection pad of the joint portion 21c through wiring members.

A printed circuit board 41 is fixed by screw to an outer surface of the bottom wall 12a of the base 12. The printed circuit board 41 constitutes a control unit, which controls the operation of the spindle motor 19 and the operation of the VCM 24 and the magnetic heads 17 via the board unit 34.

Figure 2:
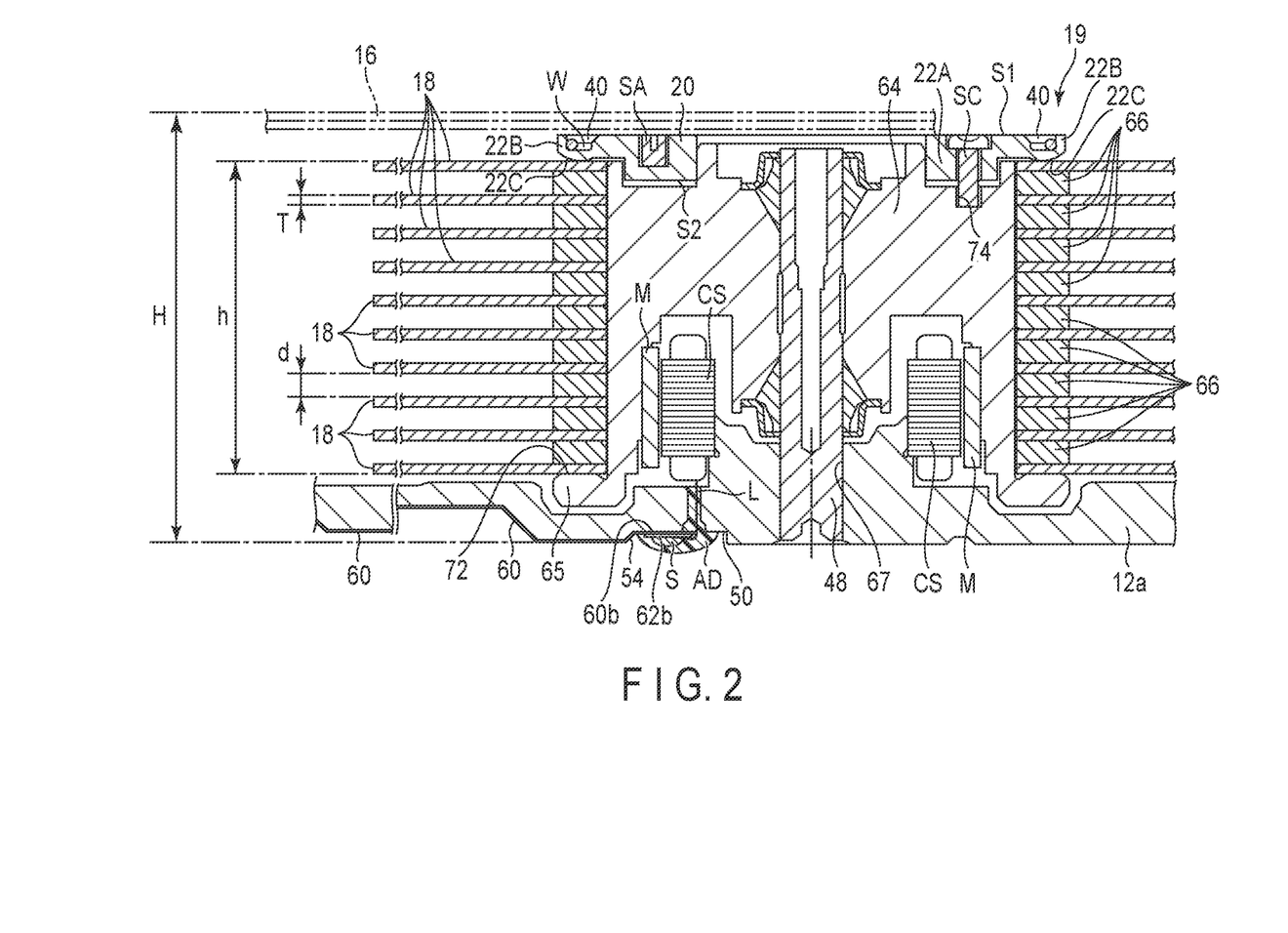
FIG. 2 is a cross-sectional view of the HDD taken along line E-E in FIG. 1.

FIG. 2 is a cross-sectional view of the spindle motor portion of the HDD taken along line E-E in FIG. 1.

As shown in the figure, for example, the spindle motor 19 comprises a pivot shaft 48 provided to stand substantially vertically on the bottom wall 12a, a substantially cylindrical spindle hub 64 supported rotatably around the pivot shaft 48, and a stator coil CS fixed to the bottom wall 12a and disposed around the pivot shift 48, and a cylindrical magnet M mounted on an inner circumferential surface of the spindle hub 64 and opposing the stator coil CS.

A proximal end portion of the pivot shaft 48 is press-fitted into a through-hole 67 formed in the bottom wall 12a.

The spindle hub 64 includes an outer circumference positioned coaxial with the pivot shift 48 and an annular flange integrally formed at a lower end of the outer circumference (an end on a bottom wall 12a side). The flange 65 includes an annular disk mounting surface 72 on which the magnetic disks 18 are placed. A lower end of the spindle hub 64 and the flange 65 oppose the inner surface of the bottom wall 12a with a gap of about 0.4 mm, for example, therebetween.

A flexible printed circuit board (FPC) 60 electrically connecting to the spindle motor 19 is attached and fixed to the outer surface of the bottom wall 12a. On the outer surface of the bottom wall 12a, a recess 50 of a predetermined shape is formed around the pivot shift 48. A stepped portion 54 is formed at the boundary between the recess 50 and the outer surface of the bottom wall 12a. The FPC 60 includes one end connected to the printed circuit board 41, an other end 60b disposed in the recess 50, and a plurality of connection pads 62b provided on the other end portion 60b. The connection pads 62b are electrically connected to the wiring lines of the FPC 60. Lead wires L drawn from the coil CS of the spindle motor 19 are joined to the connection pads 62b by a solder S. An adhesive AD is filled to the recess 50 and covers the connection pads 62b and the solder joint portion.

The magnetic disks 18 are engaged with the outer circumference of the spindle hub 64 with the spindle hub 64 inserted into their inner holes. Further, annular spacer rings 66 are attached to the outer circumference of the spindle hub 64 so as to be each interposed between each adjacent pair of magnetic disks 18. The magnetic disks 18 and the spacer rings 66 are mounted on the flange 65 of the spindle hub 64 in order in an alternating overlapping manner. A clamp 20 attached to the upper end of the spindle hub 64 presses the inner circumferential portions of the magnetic disks 18 and the spacer rings 66 toward the flange 65. Thus, the ten magnetic disks 18 are fixed to the spindle hub 64 in a stacked state with a predetermined interval between each other, and are supported rotatably with the spindle hub 64 as one body. The ten magnetic disks 18 are supported parallel to each other and substantially parallel to the bottom wall 12a with predetermined intervals therebetween.

A height (thickness) H of the housing 10 including the top cover 16 is formed to, for example, a maximum of 26.1 mm in accordance with the 3.5 inches HDD standard. The thickness T of each magnetic disk 18 is 0.35 to 0.635 mm, and in this embodiment, it is 0.635 mm. The interval d (corresponding to the thickness of the spacer ring) between two adjacent magnetic disks 18 is 1.2 mm or more but 1.65 mm or less, and in this embodiment, it is set to 1.484 mm. A stack height h of all the magnetic disks (the height from the lower surface of the lowermost magnetic disk to the upper surface of the uppermost magnetic disk) is 18.356 mm in this embodiment.

The clamp 20 will now be described in detail.

Figure 3:
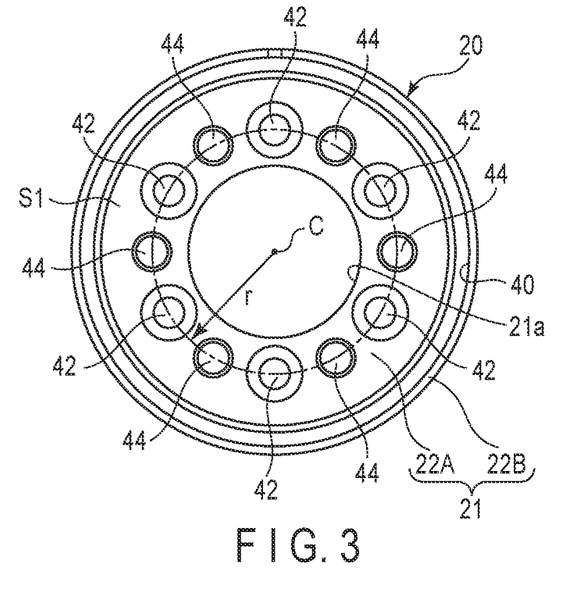
FIG. 3 is a plan view of a disk clamp.
Figure 4:
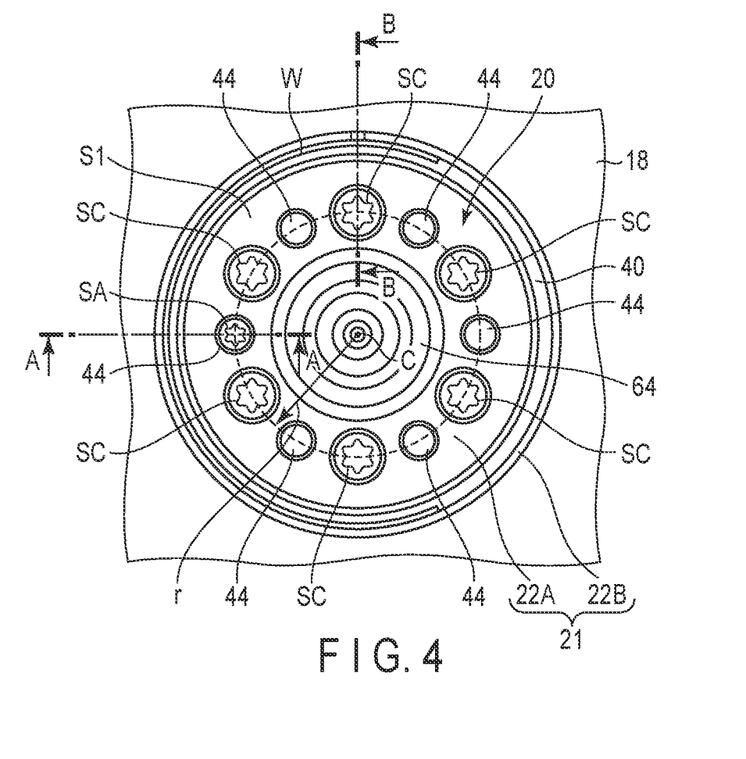
FIG. 4 is a plan view of the disk clamp in the state that it is attached to a spindle hub.
Figure 5:
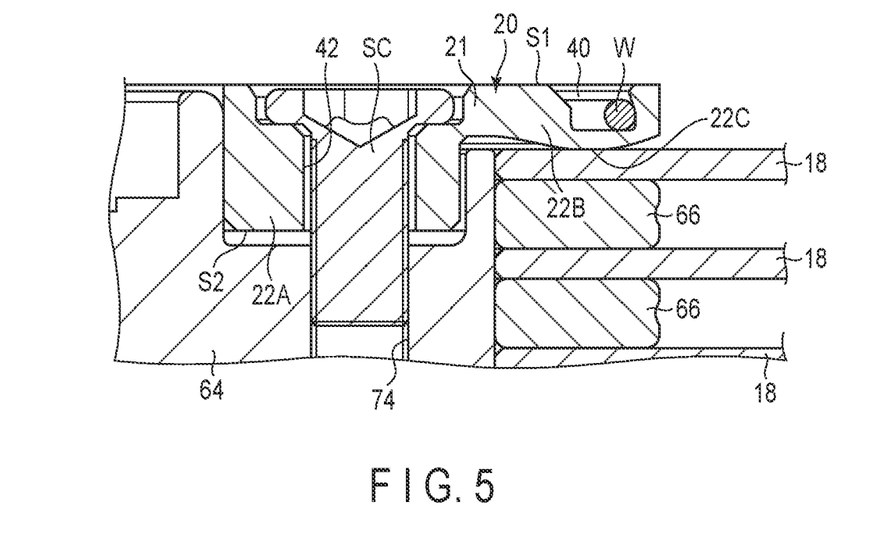
FIG. 5 is a cross-sectional view of the disk clamp taken along line B-B in FIG. 4.
Figure 6:
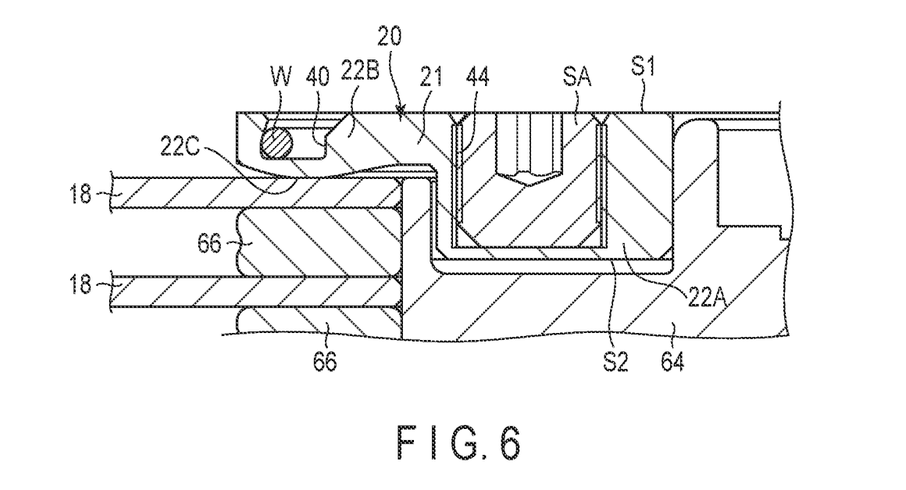
FIG. 6 is a cross-sectional view of the disk clamp taken along line A-A in FIG. 4.

FIG. 3 is a plan view of the clamp, FIG. 4 is a plan view of the clamp in the state being attached to the spindle hub, FIG. 5 is a cross-sectional view of the clamp taken along line B-B in FIG. 4, and FIG. 6 is a cross-sectional view of the clamp taken along line A-A in FIG. 4.

As shown in FIG. 3, the clamp 20 comprises a disk-shaped main body 21 having a center (central axis line) C. The main body 21 includes an inner hole 21a concentric with the central axis line C and is annular. The main body 21 is formed of, for example, aluminum. As shown in FIG. 2, the main body 21 includes a substantially flat first surface S1 located on the side of the top cover 16 and a second surface S2 located on the side of the magnetic disk 18. The inner circumferential portion of the main body 21 is formed thicker than the outer circumferential portion and constitutes an annular fixing portion 22A. The outer circumferential portion of the main body 21 constitutes an annular pressing portion 22B, which is thinner than the fixing portion 22A. On the second surface S2, the second surface of the pressing portion 22B is formed to be an arc shape protruding slightly toward the magnetic disk 18, and constitutes a contacting surface 22C that is brought into contact with the magnetic disk 18.

An outer diameter of the main body 21 (an outer diameter of the pressing portion 22B) is larger than an outer diameter of the spindle hub 64 (an inner diameter of the magnetic disk 18) and an inner diameter of the pressing portion 22B, that is, the outer diameter of the pressing portion 22B is set smaller than the outer diameter of the spindle hub 64. In the state where the fixing portion 22A of the clamp 20 is fixed to the spindle hub 64, the contacting surface 22C of the pressing portion 22B is brought into contact with the upper surface on the inner circumferential side of the magnetic disk 18 and pressed against.

As shown in FIGS. 3 and 4, the clamp 20 includes an annular mounting groove 40 formed in the main body 21 to which a wire for adjustment of unbalance can be fitted, and a plurality, for example, six through-holes (sitting portions) 42 through which the fixing screws for fixing the clamp 20 are inserted, and a plurality of, for example, six female threaded holes 44 in which adjustment screws for balancing can be engaged.

The mounting groove 40 is formed annular and concentric with the central axis line C, formed in the pressing portion 22B on the first surface S1 of the main body 21, and is located adjacent the outer circumferential edge of the main body 21. The diameter of the mounting groove 40 is formed, for example, to be about 31 mm.

The six through-holes 42 are formed through the fixing portion 22A of the body 21, to each extend parallel to the central axis line C. The six through-holes 42 are each provided at a position where the center of the hole overlaps a circle of radius r, and are arranged at equal intervals from each other in the circumferential direction. The through-holes 42 are not threaded. In this embodiment, the radius r=10 mm.

The six female threaded holes 44 are formed in the fixing portion 22A and are each located in a position where the center of the hole overlaps the circle of radius r. The six female threaded holes 44 are arranged at equal distances from each other in the circumferential direction and are each located in the middle of two adjacent through-holes 42 along the circumferential direction. The female threaded holes 44 are bottomed holes, one end of which is open to the first surface S1 of the main body 21 and the other end is closed. A female thread is cut on the inner circumference of each female threaded hole 44. The female threaded holes 44 are threaded holes of, for example, about M3.

As shown in FIGS. 2 and 4, the clamp 20 is placed over the upper end of the spindle hub 64 and coaxially with the spindle hub 64, and is screwed and fixed to the spindle hub 64 by six fixing screws SC. The fixing portion 22A of the clamp 20 fits into a recess in the spindle hub 64. As shown in FIG. 5, the fixing screws SC are inserted into the through-hole 42 from the side of the first surface S1 and further screwed into the threaded hole 74 of the spindle hub 64. Thus, the fixing portion 22A of the clamp 20 is fixed to the spindle hub 64, and the contact surface 22C of the pressing portion 22B is brought into contact with the inner circumference of the uppermost magnetic disk 18. Accordingly, the magnetic disks 18 and the spacer rings 66 are clamped between the clamp 20 and the flange 65.

When adjusting the unbalance of rotating bodies such as magnetic disks 18 and spacer rings 66, a wire W for adjustment is fitted in the mounting groove 40 of the clamp 20. The wire W can be, for example, made of stainless steel, SUS304, and has a diameter of 0.65 mm. The wire W is installed in the mounting groove 40 and is fixed to the main body 21 by the restoring force of the wire itself expanding outward. The amount of unbalance correction can be adjusted by the length of the wire W.

The wire W can generate an unbalance at a maximum of about 1.1 gmm by adjusting its length. As described above, in an HDDs in which ten magnetic disks 18 each having a thickness of 0.635 mm and a diameter of 96 mm, are stacked and arranged, the unbalance of the rotating body can may exceed 1.1 gmm. In this case, some of the unbalance cannot be fully corrected by the wire W. To enable unbalance correction in all HDDs, an unbalance correction capability of about 1.8 gmm is required.

Therefore, if the unbalance of the rotating body exceeds 1.1 gmm, as shown in FIGS. 4 and 6, an adjustment screw SA for unbalance adjustment is screwed into the female threaded hole 44 of the clamp 20. When the screw SA is made of brass, for example, and it weighs about 0.1 g. When the screw SA is installed in the female threaded hole 44 provided at a position of a radius r=10 mm, the unbalance generated by the adjustment screw SA will be 0.1×10=1 gmm. The wire W and the adjustment screw SA together can correct the unbalance of about 2.1 gmm. In this embodiment, the so-called socket set screw without a head is used as the adjustment screw SA.

Note that the adjustment screw SA is screwed into only the fixing portion 22A of the clamp 20 and does not reach the spindle hub 64 of the motor. Therefore, the screw SA does not affect the clamping force of the clamp 20. Further, since the female thread hole 42 is a bottomed hole (non-through hole), it can prevent wear dust from scattering outside the thread hole during screw installation.

Figure 7:
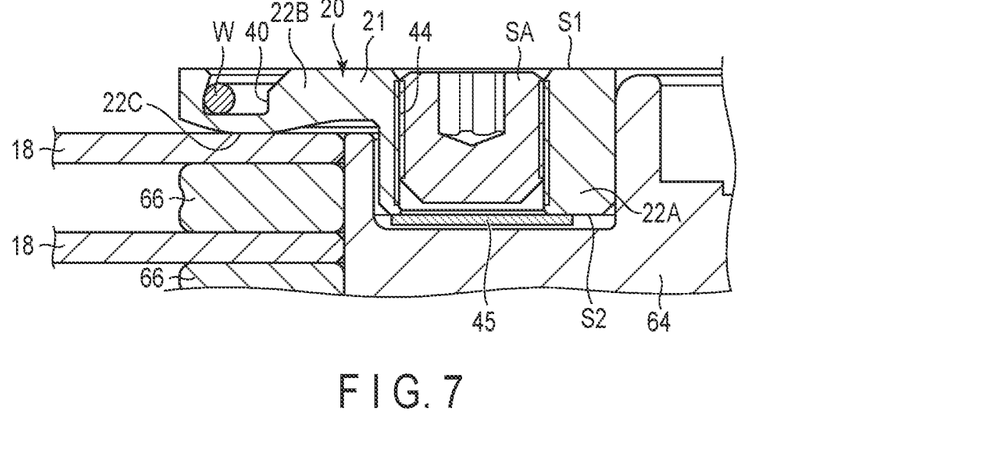
FIG. 7 is a cross-sectional view of a disk clamp according to a modified example.

When it is difficult to make a non-through hole to secure the screw length, for example, as shown in FIG. 7, the female thread hole 44 may as well be a through hole. That is, the female thread hole 44 may be constituted by a through hole formed through the main body 21 and a female thread cut in the inner circumference of the through hole, or the lower end opening of the female thread hole 44 may be sealed by a sealant 45 affixed to the second surface S2 of the clamp 20.

Next, an example of the unbalance correction method will be described.

Figure 8:
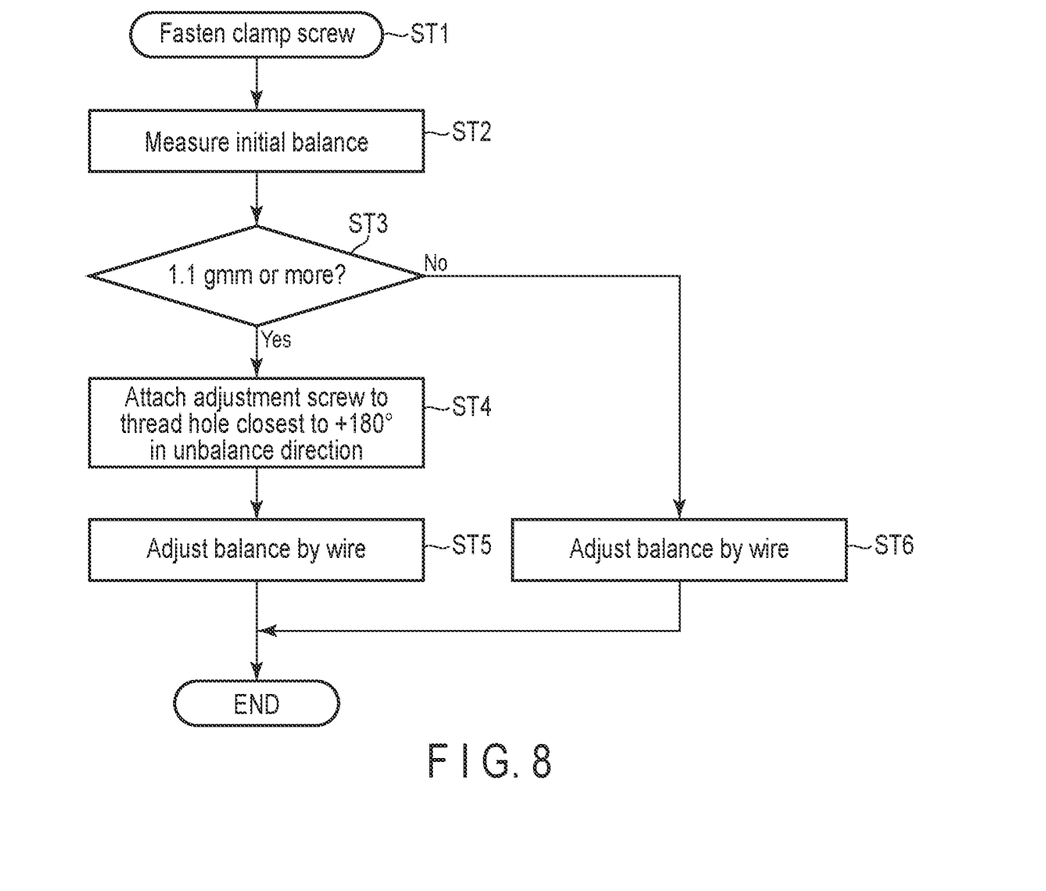
FIG. 8 is a flowchart showing the clamp installation process for the HDD according to the first embodiment.

FIG. 8 is a flowchart showing an example of the unbalance correction method.

As shown in the figure, first, the magnetic disks 18 and the spacer rings 66 are mounted on the spindle hub 64 of the spindle motor 19, and stacked on the flange 65. Then, the clamps 20 is set on the upper end of the spindle hub 64, and six fixing screws SC are used to fasten the clamp 20 to the spindle hub 64 (ST1).

Next, unbalance measurement of the initial state is carried out (ST2). Although the details of the unbalance measurement method are omitted, it is possible to measure the rotation synchronous component of the acceleration generated in the housing by the motor rotation, and determine the direction and magnitude of the unbalance of the rotating body from the maximum value of the acceleration and the phase that takes the maximum value.

Then, whether the measured initial unbalance value is 1.1 gmm or greater is determined (ST3). When it is 1.1 gmm or less, the unbalance can be corrected only by adding the wire W. Therefore, a wire W of an appropriate length is mounted in an appropriate direction to the mounting groove 40 of the clamp 20, and thus the correction is completed (ST6).

When the initial unbalance value exceeds 1.1 gmm, the adjustment screw SA for unbalance adjustment is screwed into the female thread hole 44 closest to +180° in an unbalance direction with respect to the center axis line C (ST4).

When the mounting positions of the adjustment screws SA are perfectly aligned with +180° in the unbalance direction, the maximum unbalance correction effect is exhibited by the adjustment screws SA. However, since there are only six adjustment screw mounting positions, that is, female thread holes 44, a maximum of deviation of 30° from the ideal direction may occur.

Figure 9:
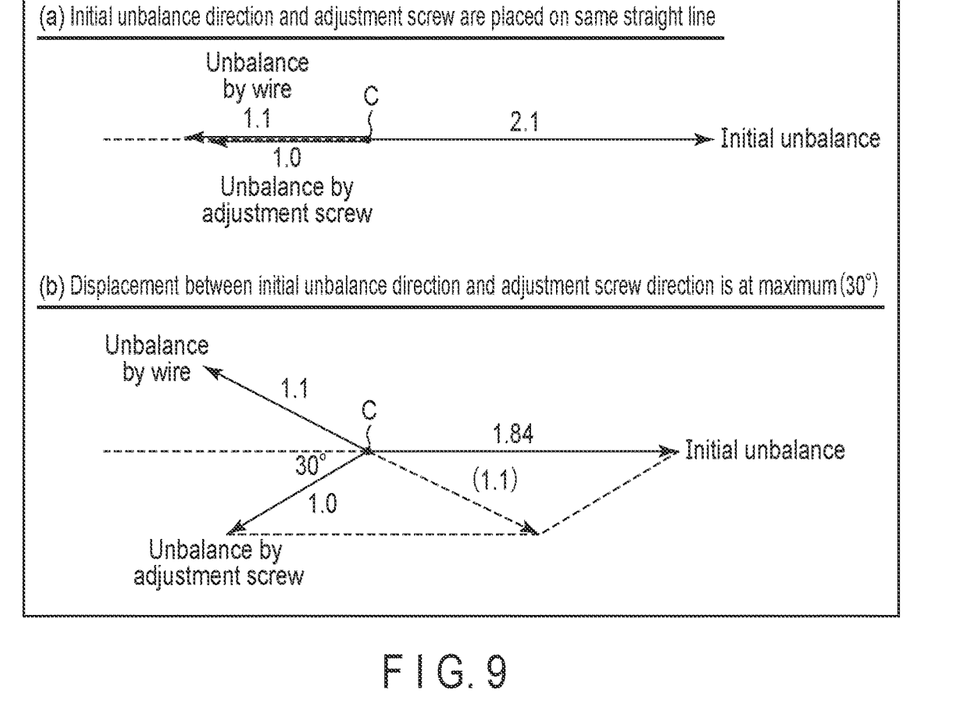
FIG. 9 is a diagram schematically showing an example of unbalance adjustment of the HDD according to the first embodiment.

FIG. 9 is a schematic diagram showing the state of balance among the initial unbalance, the unbalance caused by the adjustment screw, and the unbalance caused by the wire. As shown in FIG. 9, part (a), when the adjustment screws SA are placed on the same straight line as that of the initial unbalance direction through the center axis line C, the adjustment screws SA maximizes the effect of unbalance correction, and together with the correction capability of 1.1 gmm by the wire, the initial unbalance of 2.1 gmm can be corrected. As shown in FIG. 9, part (b), even when the adjustment screws SA are positioned off the straight line in the initial unbalance direction, the maximum initial unbalance of 1.84 gmm can be corrected. As compared to the case where unbalance correction is carried out by the wire W alone, the correction capability can be greatly improved.

As shown in FIG. 8, if only the adjustment screws SA alone are insufficient to correct the unbalance, a wire W of an appropriate length is mounted in an appropriate direction to the mounting groove 40 of the clamp 20, and thus the correction is completed (ST5).

According to the HDD and the disk clamp of the first embodiment configured as described above, a threaded hole to which an adjustment screw different from the fixing screw for fixing the clamp can be mounted is provided in the clamp, and by using the screw and the wire together, it is possible to expand the range in which the imbalance of the rotating body can be corrected. Here, the threaded hole is formed in the clamp itself, the adjustment screw attached to the threaded hole does not affect the fastening force of the magnetic disk. Therefore, the magnetic disk can be clamped uniformly by the clamp even when the adjustment screw is installed. At the same time, there is no need to increase the diameter of the wire for correction and that of the mounting groove where this wire is mounted, and the unbalance correction range can be expanded without increasing the thickness of the clamp. Further, by expanding the range in which the unbalance can be corrected, it is possible to carry out balance adjustment of a device with a large unbalance that would require disassembly and reassembly in conventional technique, thereby improving the manufacturing yield of the device.

As described above, according to the first embodiment, a disk clamp and disk device which can easily adjust the unbalance of the rotating body and improve the yield of the device, can be provided.

Note that in the first embodiment, the number of through-holes 42 and female thread holes 44 of the clamp 20 is not limited to six, but can be increased or decreased as necessary. It is not limited to such a structure that the number of the through-holes 42 and the number of the female thread holes 44 are the same 30 as each other, and the through-holes 42 may be more or less than the female thread holes 44 in number. The adjustment screws SA are not limited to socket set screws, but other types of screws may be used. The material used to form the adjustment screws SA is not limited to brass, but may be some other material, for example, stainless steel.

Next, a clamp of an HDD according to other embodiments will be described. In the other embodiments provided below, parts identical to those of the first embodiment described above will be denoted by the same reference symbols, and the detailed descriptions thereof will be omitted or simplified. The parts different from those of the first embodiment will be mainly described.

Second Embodiment

Figure 10:
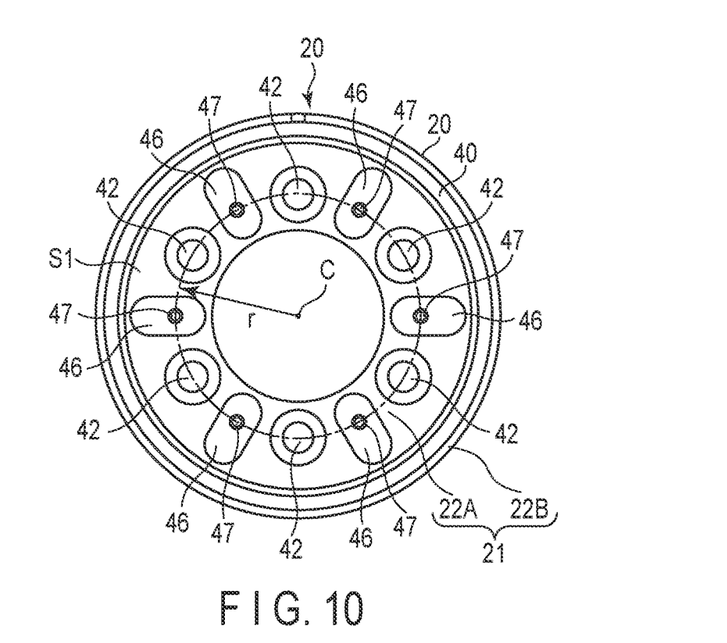
FIG. 10 is a plan view of a disk clamp in a hard disk drive (HDD) according to a second embodiment.
Figure 11:
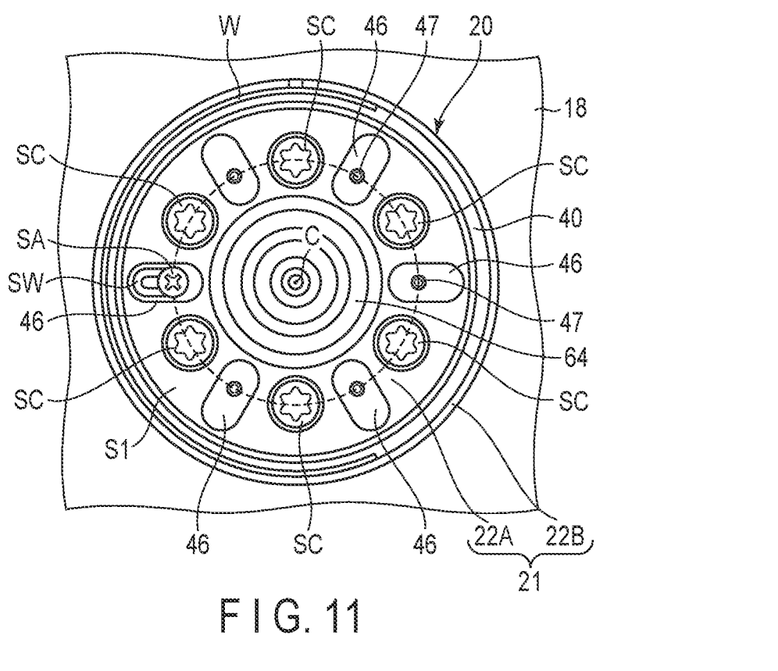
FIG. 11 is a plan view of the disk clamp in a state being attached to a spindle hub.
Figure 12:
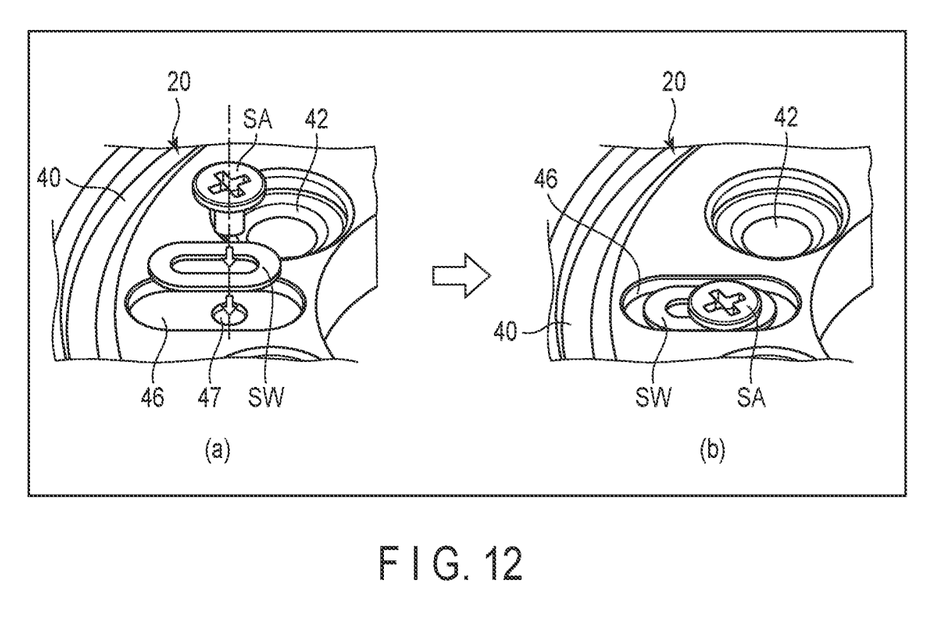
FIG. 12 is a perspective view of the disk clamp before and after a washer and an adjustment screw are attached.
Figure 13:
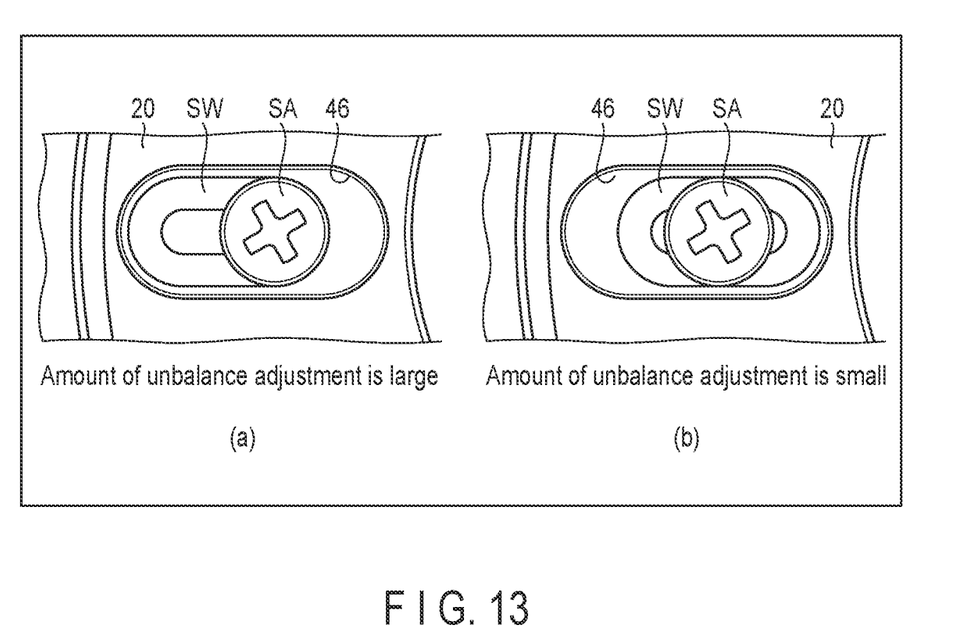
FIG. 13 is an enlarged plan view of the washer and adjustment screw.

FIG. 10 is a plan view of a disk clamp in an HDD of the second embodiment, FIG. 11 is a plan view of the disk clamp in the state being attached to the spindle hub, FIG. 12 is a perspective view of the disk clamp before and after a washer and an adjustment screw are attached, and FIG. 13 is an enlarged plan view of the washer and adjustment screw.

As shown in FIGS. 10 and 11, according to the second embodiment, the clamp 20 comprises six through-holes 42 in each of which a fixing screw SC is inserted, six female thread holes 47 each formed between each adjacent pair of the through-holes 42 and into which the adjustment screws SA can be screwed, and further, six oval recesses (sitting portions) 46 each formed in an area including the respective female thread hole 47. The through-holes 42 and the threaded holes 47 are provided such that the center of the arrangement is located on a circle of radius r and are further spaced apart from each other equally in the circumferential direction. The recesses 46 are formed in the first surface S1 of the clamp 20 and extend in the radial direction with respect to the central axis line C.

The clamp 20 includes oval-shaped washers SW that can be mounted in the recesses 46. The washers SW are formed, for example, of a stainless steel material and have an oval-shaped inner hole.

Note that when thin washers SW are used, the recesses 46 of the clamp body may be omitted.

As shown in FIG. 12, parts (a) and (b), while the washer SW being installed in a recess 46, the adjustment screw SA is screwed into the female thread hole 47 through the inner hole of the washer SW, and thus the washer SW is clamped between the adjustment screw SA and the clamp 20 to be fixed. Note that in the second embodiment, the adjustment screw SA is an ordinary screw with a head. Therefore, the washer SW is held between the head of the adjustment screw SA and the clamp 20.

By providing the washer SW in addition to the adjustment screw SA, the range of unbalance correction can be further expanded.

The washer SW and its inner hole are oval in shape, and within the recess 46, the washer SW can be moved and positioned in the radial direction of the clamp 20. By adjusting the radial position of the washer SW, the amount of unbalance correction (adjustment amount) by the washer SW can be finely adjusted.

As shown in FIG. 13, part (a), as the washer SW is positioned more radially outward, the amount of the unbalance adjustment becomes greater, and as shown in FIG. 13, part (b), as the washer SW is positioned more radially inward, the amount of unbalance adjustment becomes less.

In the second embodiment, the other configurations of the HDD are identical to those of the HDD of the first embodiment described above.

According to the HDD of the second embodiment configured as described above, when the adjustment screws SA and the washers SW can be attached to the clamp 20, the range in which the unbalance of the rotating body can be corrected can be further expanded, and a larger unbalance can be corrected. Thus, a disk clamp and disk device that can easily adjust the unbalance of the rotating body and improve the yield of the equipment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the embodiments described above, the material used to form the clamp is not limited to aluminum, but may be stainless steel, for example. The number of magnetic disks installed is not limited to ten, but may be nine or less or eleven or more. The thickness of the magnetic disks is not limited to 0.635 mm or 0.5 mm, but can be changed in various ways as needed. Similarly, the diameter of the magnetic disks is not limited to 96 mm, but may be 95 mm or 97 mm. The material used to form the substrate of the magnetic disk is not limited to aluminum, but can also be glass or the like. The material used to form the spacer rings is not limited to aluminum, but may be, for example, titanium, stainless steel, glass or the like. Further, the material used to form the adjustment screws is not limited to brass, but may be, for example, stainless steel.

What is claimed is:

1. A disk clamp comprising:
    a disk-shaped main body including a central axis line;
    an annular mounting groove provided in a first surface of the main body, in which a wire for unbalance adjustment is mountable;
    a plurality of through-holes formed through the main body and arranged to be spaced apart from each other equally in a circumferential direction around the central axis line, through each of which a fixing screw is insertable;
    a plurality of female threaded holes formed on the first surface of the main body and spaced apart from each other equally in the circumferential direction, into each of which an adjustment screw for balancing adjustment is screwable; and
    a washer provided on the first surface of the main body to be displaceable in a radial direction of the main body, wherein the adjustment screw is screwable into the female threaded hole via the washer provided on the first surface, and the washer is to be fixed to the main body by the adjustment screw in a state where the washer is positioned at an arbitrary radial position.

2. The disk clamp of claim 1, wherein
the plurality of female threaded holes are each provided between two adjacent through-holes in the circumferential direction.

3. The disk clamp of claim 2, wherein
the plurality of through-holes and the plurality of female threaded holes are arranged on a same circle centered around the central axis line.

4. The disk clamp of claim 3, wherein
the plurality of through-holes coincide in number with the plurality of female threaded holes.

5. A disk device comprising:
    a housing having a height specified in a 3.5-inch disk device standard;
    a spindle motor including a spindle hub rotatably supported and disposed in the housing;
    ten or more magnetic disks mounted on the spindle hub; and
    a disk clamp of claim 1, fixed to the spindle hub and clamping the magnetic disks, wherein the female threaded holes each comprise a bottomed hole opening to the first surface of the main body and a female thread cut in an inner circumferential surface of the bottomed hole.

6. A disk device comprising:
a housing having a height specified in a 3.5-inch disk device standard;
a spindle motor including a spindle hub rotatably supported and disposed in the housing;
ten or more magnetic disks mounted on the spindle hub; and
a disk clamp of claim 1, fixed to the spindle hub and clamping the magnetic disks, wherein
the female threaded holes each comprise a through hole formed through the main body and a female thread formed in an inner circumferential surface of the through hole, and a seal material is attached onto a second surface of the main body to close an opening of the through hole on a side of the second surface.

7. A disk device comprising:
a housing having a height specified in a 3.5-inch disk device standard;
a spindle motor including a spindle hub rotatably supported and disposed in the housing;
ten or more magnetic disks mounted on the spindle hub; and
a disk clamp of claim 1, fixed to the spindle hub and clamping the magnetic disks.

8. The disk device of claim 7, wherein
each of the ten or more magnetic disks has a thickness of 0.635 mm and a diameter of 3.5 inches, and the ten or more magnetic disks are stacked on a flange of the spindle hub and supported by the spindle hub.

9. The disk device of claim 7, wherein
the housing is filled with a low-density gas having a density lower than that of air and sealed therein.

10. The disk device of claim 7, wherein
the plurality of female threaded holes are each provided between two adjacent through-holes in the circumferential direction.

11. The disk device of claim 10, wherein
the plurality of through-holes and the plurality of female threaded holes are arranged on a same circle centered around the central axis line.

12. The disk device of claim 11, wherein
the plurality of through-holes coincide in number with the plurality of female threaded holes.

13. A disk clamp comprising: of claim 1,
a disk-shaped main body including a central axis line;
an annular mounting groove providing in a first surface of the main body, in which a wire for unbalance adjustment is mountable;
a plurality of through-holes formed through the main body and arranged to be spaced apart from each other equally in a circumferential direction around the central axis line, through each of which a fixing screw is insertable; and
a plurality of female threaded holes formed on the first surface of the main body and spaced apart from each other equally in the circumferential direction, into each of which an adjustment screw for balancing adjustment is screwable, wherein
the female threaded holes each comprise a through hole formed through the main body and a female thread formed in an inner circumferential surface of the through hole, and a seal material is attached onto a second surface of the main body to close an opening of the through hole on a side of the second surface.

14. A disk clamp comprising:
a disk-shaped main body including a central axis line;
an annular mounting groove provided in a first surface of the main body, in which a wire for unbalance adjustment is mountable;
a plurality of through-holes formed through the main body and arranged to be spaced apart from each other equally in a circumferential direction around the central axis line, through each of which a fixing screw is insertable; and
a plurality of female threaded holes formed on the first surface of the main body and spaced apart from each other equally in the circumferential direction, into each of which an adjustment screw for balancing adjustment is screwable;
wherein the female threaded holes each comprise a bottomed hole opening to the first surface of the main body and a female thread cut in an inner circumferential surface of the bottomed hole.

15. A disk device comprising:
a housing having a height specified in a 3.5-inch disk device standard;
a spindle motor including a spindle hub rotatably supported and disposed in the housing;
ten or more magnetic disks mounted on the spindle hub; and
a disk clamp of claim 14, fixed to the spindle hub and clamping the magnetic disks.

* * * * *